United States Patent
Lin et al.

(10) Patent No.: US 8,150,215 B2
(45) Date of Patent: Apr. 3, 2012

(54) ROUTABLE IMAGE PIPELINE DEVICE

(75) Inventors: Po-Jung Lin, Kaohsiung (TW);
Shuei-Lin Chen, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 259 days.

(21) Appl. No.: 12/730,875

(22) Filed: Mar. 24, 2010

(65) Prior Publication Data

US 2011/0235936 A1  Sep. 29, 2011

(51) Int. Cl.
*G06K 9/54* (2006.01)
*G06T 1/00* (2006.01)

(52) U.S. Cl. .......... 382/303; 382/304; 345/501
(58) Field of Classification Search .......... 382/100–325
See application file for complete search history.

(56) References Cited

U.S. PATENT DOCUMENTS

| | | | | |
|---|---|---|---|---|
| 5,038,282 A * | 8/1991 | Gilbert et al. | ........ | 712/14 |
| 5,121,498 A * | 6/1992 | Gilbert et al. | ........ | 717/149 |
| 5,586,196 A * | 12/1996 | Sussman | ........ | 382/114 |
| 5,598,517 A * | 1/1997 | Watkins | ........ | 345/441 |
| 5,706,481 A * | 1/1998 | Hannah et al. | ........ | 345/519 |
| 5,761,720 A * | 6/1998 | Krishnamurthy et al. | .... | 711/140 |
| 5,821,944 A * | 10/1998 | Watkins | ........ | 345/582 |
| 5,826,095 A * | 10/1998 | Jordan | ........ | 712/11 |
| 5,987,567 A * | 11/1999 | Rivard et al. | ........ | 345/552 |
| 6,094,726 A * | 7/2000 | Gonion et al. | ........ | 713/400 |
| 6,615,319 B2 * | 9/2003 | Khare et al. | ........ | 711/141 |
| 6,744,438 B1 * | 6/2004 | Baldwin | ........ | 345/552 |
| 6,822,654 B1 * | 11/2004 | Trivedi et al. | ........ | 345/520 |
| 7,487,327 B1 * | 2/2009 | Chang et al. | ........ | 711/203 |
| 7,587,261 B2 * | 9/2009 | Hopkins | ........ | 700/259 |
| 2002/0107613 A1 * | 8/2002 | Hopkins | ........ | 700/269 |
| 2008/0320268 A1 * | 12/2008 | Wingard et al. | ........ | 711/202 |
| 2010/0026844 A1 * | 2/2010 | Hopkins | ........ | 348/231.2 |

* cited by examiner

*Primary Examiner* — Manav Seth
(74) *Attorney, Agent, or Firm* — Morris Manning & Martin LLP; Tim Tingkang Xia, Esq.

(57) ABSTRACT

An image pipeline device is used for processing an image. The device comprises an external memory, a direct memory access (DMA), an image pipeline controller, and a filter layer. The image pipeline controller comprises a physical memory allocation (PMA) having a physical buffer unit, and a first array controller for configuring the physical buffer unit as a corresponding first logic buffer unit. The filter layer comprises a first filter set electrically connected to the first array controller correspondingly and having a plurality of filters. The first filter set receives the image through the first array controller, processes the image selectively according to the first logic buffer unit and the filters, and stores the processed image back to the external memory through the DMA.

12 Claims, 8 Drawing Sheets

ROUTABLE IMAGE PIPELINE DEVICE

BACKGROUND OF THE INVENTION

1. Field of Invention

The present invention relates to an image pipeline, and more particularly to a routable image pipeline device.

2. Related Art

In recent daily life, various digital technologies replacing conventional analog technology have become very popular, and among others, the digital image technology is a good example. In a digital image, values of pixels in the image are recorded in an array form, and the value of each pixel in the image is represented by limited bits.

For example, a digital camera captures an image with an optical sensor and converts the image into a digital signal, and a series of image processing is performed on the digital signal. The most common method for processing the digital image is to apply various filters to the digital image, for example, to process original mono color pixels of the digital image to RGB pixels and YUV pixels sequentially by using filters, or perform various digital image processing such as noise reduction, image sharpening, image tone variation, image brightness variation, or edge detection on the digital image.

In addition, in order to perform the step of digital image processing requiring a plurality of filters, image pipeline architecture emerges. The image pipeline connects the filters to be executed, and provides a line buffer corresponding to each filter respectively, so as to store image pixels. However, the conventional image pipeline has the disadvantages that the line buffer lacks flexibility in use and it is inconvenient in modification and expansion. The length of the line buffer is limited by a scanning mode of accessing the digital image or the length of the digital image, and the number of the line buffers is limited by the size of the corresponding filters, for example, a 3×3 filter or a 7×7 filter. Further, the filters used by the image pipeline are fixed, so the image pipeline can only be used for processing fixed digital images, and thus lacks expandability. Moreover, if the line buffers of the image pipeline are insufficient, the line buffers have to be expanded one by one, which is rather inconvenient.

SUMMARY OF THE INVENTION

Accordingly, the present invention is a routable image pipeline device, which is suitable for processing an image.

In a first embodiment of the present invention, the routable image pipeline device comprises an external memory, a direct memory access (DMA), an image pipeline controller, and a filter layer. The external memory stores the image to be processed, and is electrically connected to the DMA. The image pipeline controller comprises a physical memory allocation (PMA) and a first array controller; the PMA has at least one physical buffer unit. The first array controller according to the present invention is electrically connected to the PMA and the DMA. The first array controller receives the image through the DMA, and configures the physical buffer unit into a first logic buffer unit corresponding to the first array controller according to memory address configuration setting.

The filter layer comprises a first filter set having a plurality of filters, and the first filter set is electrically connected to the first array controller correspondingly. The first filter set receives the image through the first array controller, processes the image selectively according to the first logic buffer unit and the filters, and stores the processed image back to the external memory through the DMA.

In a second embodiment of the present invention, the image pipeline controller of the routable image pipeline device further comprises a second array controller, and the filter layer further comprises a second filter set electrically connected to the second array controller. The second filter set comprises the plurality of filters. The second array controller configures the physical buffer unit into a second logic buffer unit according to the memory address configuration setting, and the first filter set receives the image. The second array controller transmits the received image to the second filter set for processing, and the second filter set processes the image selectively according to the second logic buffer unit and the filters of the second filter set. The second filter set stores the processed image back to the external memory through the DMA.

The PMA of the routable image pipeline device further comprises a buffer switch. The buffer switch is electrically connected to the physical buffer unit, the first array controller, and the second array controller, and the first array controller and the second array controller access the physical buffer unit through the buffer switch.

In a third embodiment of the present invention, the routable image pipeline device comprises the external memory, the DMA, the image pipeline controller, and the filter layer. The image pipeline controller comprises the PMA and the plurality of array controllers. The array controllers receive the image through the DMA, and configure physical buffer units as the plurality of logic buffer units respectively corresponding to the array controllers.

In a fourth embodiment of the present invention, the filter layer comprises the plurality of filter sets. Each filter set is electrically connected to the array controller correspondingly, and each filter set comprises at least one filter. The filter sets receive the image through the corresponding array controllers for processing. The filter layer processes the image selectively according to the logic buffer units and the filters of the filter sets, and stores the processed image back to the external memory through the DMA.

In view of the above, the routable image pipeline device according to the present invention selectively uses the filters to process the image. The routable image pipeline device manages the physical buffer units in the image pipeline controller collectively, and accesses the physical buffer units through the array controllers. That is, the array controllers configure the physical buffer units as corresponding logic buffer units according to the filters used for execution.

Moreover, the array controllers may use the logic buffer units configured from the physical buffer units in advance as buffer units for work. Through the mechanism of configuring the physical buffer units as the logic buffer units, the scanning mode of the image and the filters are no longer limits to the physical buffer units. Further, the expanded physical buffer units may be used by the whole routable image pipeline device.

In addition, when the digital image is processed, required filters or bypass lines are selected from the filter set, and thus various digital image processing may be achieved through combination of a limited number of filters. Furthermore, the routable image pipeline device can be easily expanded by adding new filters or filter sets and array controllers in pairs.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Detailed features and advantages of the present invention are described in the embodiments below, and their content is adequate for those skilled in the art to understand the technical content of the present invention and to implement the present invention. According to the content disclosed in the specification, the claims, and the drawings, those skilled in the art can easily understand the objectives and advantages of the present invention.

The present invention provides a routable image pipeline device, which is suitable for processing at least one image, particularly digital image, and thus can be applied to electronic devices or systems capable of processing digital images. Possible implementations of the routable image pipeline device provided in the present invention are illustrated below through different embodiments.

[First Embodiment]

Figure 1:
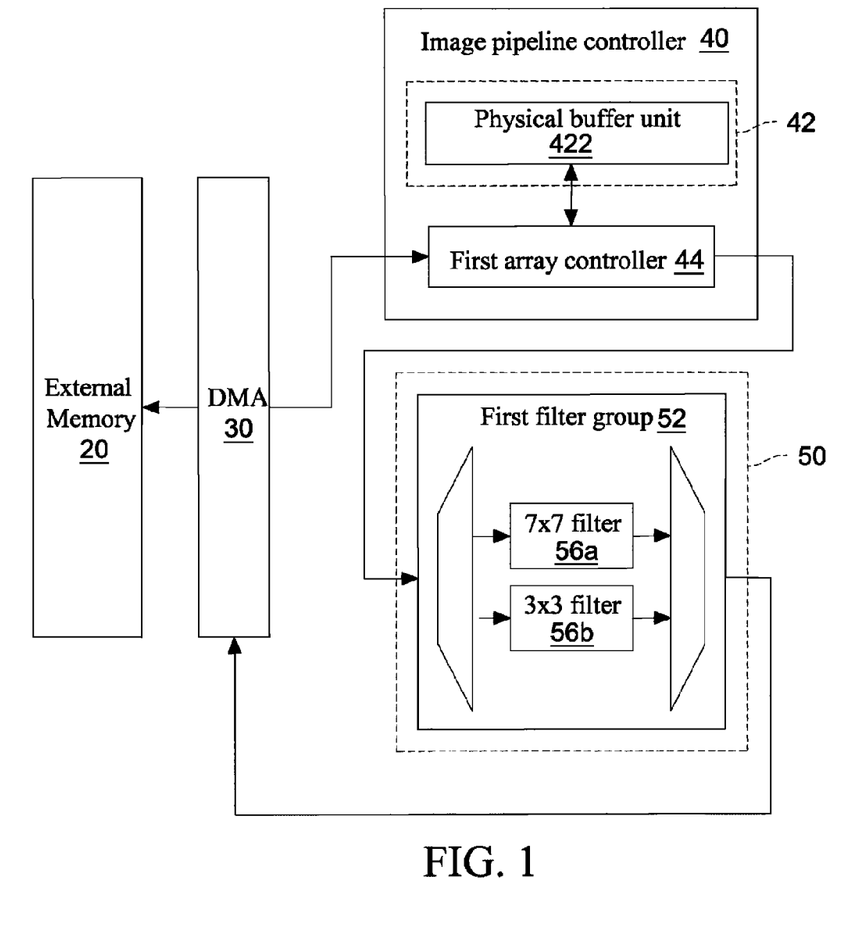
FIG. 1 is a schematic architectural view of a routable image pipeline device according to a first embodiment of the present invention.

FIG. 1 is a schematic architectural view of the routable image pipeline device according to a first embodiment of the present invention. As shown in FIG. 1, the routable image pipeline device comprises an external memory 20, a direct memory access (DMA) 30, an image pipeline controller 40, and a filter layer 50. The image pipeline controller 40 comprises a physical memory allocation (PMA) 42 and a first array controller 44, and the PMA 42 comprises at least one physical buffer unit 422. The filter layer 50 comprises a first filter set 52, and the first filter set 52 comprises a 7×7 filter 56a and a 3×3 filter 56b.

The external memory 20 stores the image to be processed, and is also provided for storing processing results of the routable image pipeline device. Preferably, the external memory 20 is a Double Data Rate Synchronous Dynamic Random Access Memory (DDR SDRAM), also referred to as DDR for short. The image to be processed in the external memory 20 is a still image or a frame in a video. In other words, the routable image pipeline device can process a single still image, or process a video by successively processing frames.

The DMA 30 is electrically connected to the external memory 20, the first array controller 44, and the first filter set 52. The DMA 30 reads the image to be processed from the external memory 20, transmits the image to be processed to the first array controller 44 for processing, and arranges the image to an array form. The physical buffer unit 422 may be at least one line buffer, and the number of the possessed lines of the line buffer depends on the size of the filter. The image is processed by the first filter set 52 and then transmitted to the DMA 30, and the processed image is stored back to the external memory 20 through the DMA 30.

More particularly, the first array controller 44 configures the physical buffer unit 422 as at least one first logic buffer unit according to memory address configuration setting. Therefore, the first array controller 44 registers the processed image in an array arrangement in the first logic buffer unit. Then, the first filter set 52 obtains the image data in the first logic buffer unit through the first array controller 44, so as to continue processing the image. The first array controller 44 comprises an M×N array controller and an M×N filter array. After the M×N array controller arranges the received image into an M×N array, the M×N array is transmitted to the M×N filter array for image processing such as noise reduction.

The filter layer 50 performs processes such as digital image processing (DIP) on the image by using the 7×7 filter 56a or the 3×3 filter 56b in the first filter set 52. It should be noted that, in this embodiment, the first filter set 52 comprises the 7×7 filter 56a and the 3×3 filter 56b at the same time, that is, the first filter set 52 comprises the plurality of filters. The routable image pipeline device processes the image selectively by using the 7×7 filter 56a or the 3×3 filter 56b. The filter size of the 7×7 filter 56a is 7×7 (pixels), and the filter size of the 3×3 filter 56b is 3×3. In the filter layer 50, the filter sizes are different from one another. In other words, the filters in the filter layer 50 have different sizes.

It should be noted that, the size of the filter suitable for the filter layer 50 is not limited to 3×3, 5×5 or 7×7. The filter can be any M×N filter, in which M and N are positive integers.

The filters in the filter layer 50 may be a raw filter, a color filter array filter (CFA filter), or a luminance-chrominance-chroma filter (YUV filter), or sub-filters of the above filter.

The method for the first array controller 44 to dynamically configure the physical buffer unit 422 as the first logic buffer unit according to the memory address configuration setting is illustrated below.

Figure 2A:
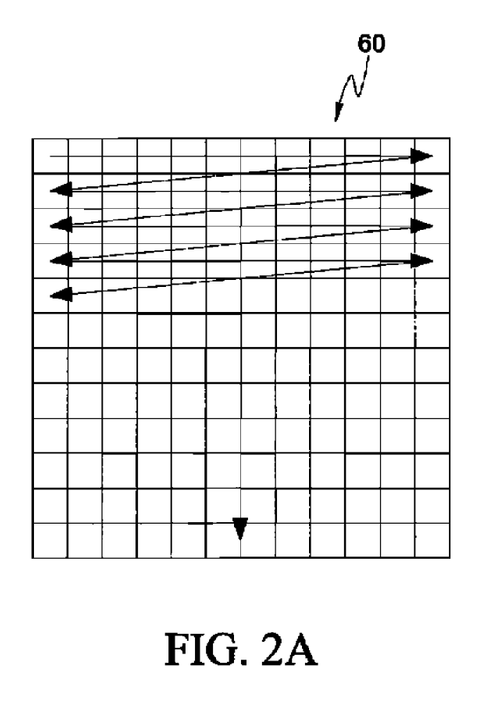
FIG. 2A is a schematic view of a frame-based scanning mode according to an embodiment of the present invention.
Figure 2B:
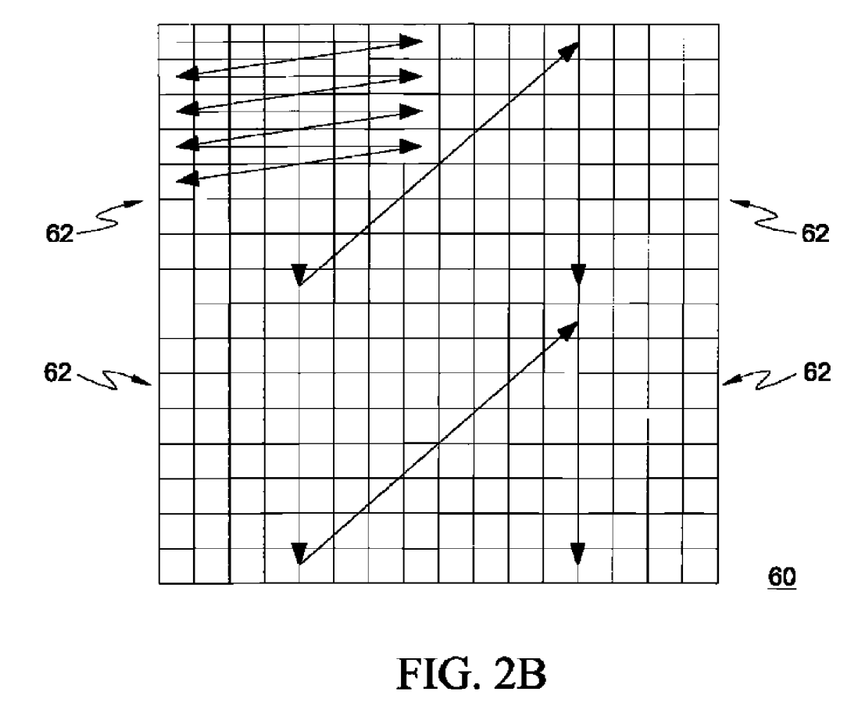
FIG. 2B is a schematic view of a tile-based scanning mode according to an embodiment of the present invention.

For a common image, values of pixels of the image are stored in an array. However, the resolution of the whole image may be larger than the line buffer (that is, the physical buffer unit 422) for buffering the image, so when the image is read by the line buffer, the part of the image that can be stored by the line buffer is related to the scanning mode of the image. Referring to FIGS. 2A and 2B together, schematic views of a frame-based scanning mode and a tile-based scanning mode of the array controller are shown respectively.

As shown in FIG. 2A, the first array controller 44 considers the image as a scan frame 60, and in the frame-based scanning mode, the pixels in the scan frame 60 are stored in the line buffer from left to right and from up to down. More particularly, in the frame-based scanning mode, the pixels of the scan frame 60 are stored in the line buffer row by row sequentially, and the filter layer 50 processes the part of the image stored in the line buffer sequentially. In the frame-based scanning mode, the length of the used line buffer is the same as the length of the scan frame 60, and no throughput overhead is generated.

The tile-based scanning mode is also referred to as a block-based scanning mode. The scan frame 60 is cut into a plurality of scan sub-frames 62 for subsequent scanning, and each scan sub-frame 62 is referred to as a tile or a block. In the tile-based scanning mode, scanning is performed on one scan sub-frame 62 in the frame-based scanning mode, and the process moves down to the next scan sub-frame 62 for scanning continuously. In the tile-based scanning mode, the length of the used line buffer is the same as the length of the scan sub-frame 62, and the length of the scan sub-frame 62 is generally set to 64 pixels or 128 pixels. In addition, according to the filter applied to the image, throughput overhead is generated at boundaries between the scan sub-frames 62 in the tile-based scanning mode.

In view of the above, the length of the line buffer required in the frame-based scanning mode is the same as the length of the scan frame 60, and the length of the line buffer required in the tile-based scanning mode is the same as the length of the scan sub-frame 62. The images of common video have a low resolution (for example, 320×240), so the images may be processed in the frame-based scanning mode. On the contrary, still images captured by a digital camera usually have a large resolution (for example, 1024×768), and thus the tile-based scanning mode is more suitable.

The routable image processing device provided in the present invention does not limit the length or the size of the physical buffer unit 422. The first array controller 44 configures the physical buffer unit 422 as the logic buffer unit according to the memory address configuration setting, and the DMA 30 and the first filter set 52 read or write the image through the logic buffer unit.

Figure 3A:
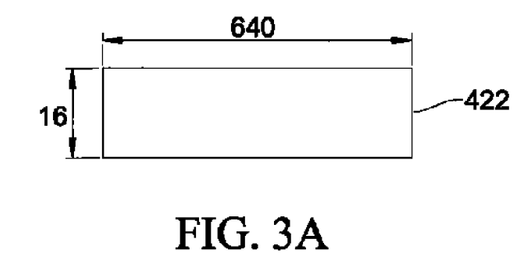
FIG. 3A is a schematic view of the configuration of a physical buffer unit according to an embodiment of the present invention.

Referring to FIGS. 3A, 3B, 3C and 3D, in which FIG. 3A is a schematic view of the physical buffer unit according to an embodiment of the present invention, and others are schematic views of the configuration of the first logic buffer unit according to different embodiments of the present invention.

Figure 3B:
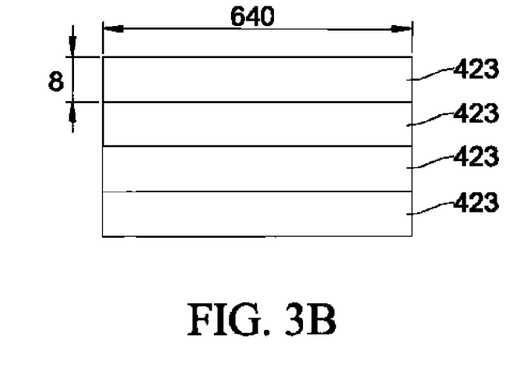
FIG. 3B is a schematic view of the configuration of a first logic buffer unit according to an embodiment of the present invention.

In this embodiment, the size of the physical buffer unit 422 is 640×16 bits. For example, when a row length of the image to be processed is 640 pixels, and the value of each pixel requires 8 bits to represent, the configuration of the logic buffer unit may be as shown in FIG. 3B. The first array controller 44 divides the physical buffer unit 422 into 640×8 first logic buffer units 423 by reallocating memory addresses, so as to form four 640×8 first logic buffer units 423 for the first array controller 44 to access image data.

Figure 3C:
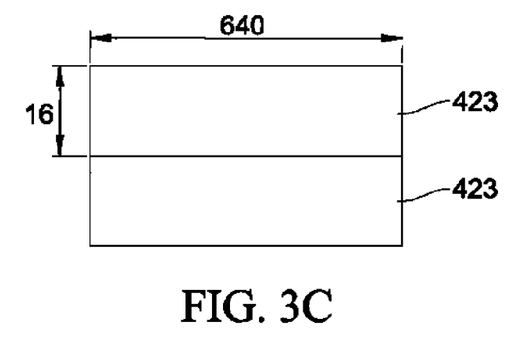
FIG. 3C is a schematic view of the configuration of a first logic buffer unit according to another embodiment of the present invention.

For another example, when the row length of the image to be processed is 640 pixels, and the value of each pixel requires 16 bits to represent, the configuration of the logic buffer unit is as shown in FIG. 3C. The first array controller 44 may directly use the physical buffer unit 422 as the first logic buffer unit 423, so as to form two 640×16 first logic buffer units 423 for the first array controller 44 to access image data.

Figure 3D:
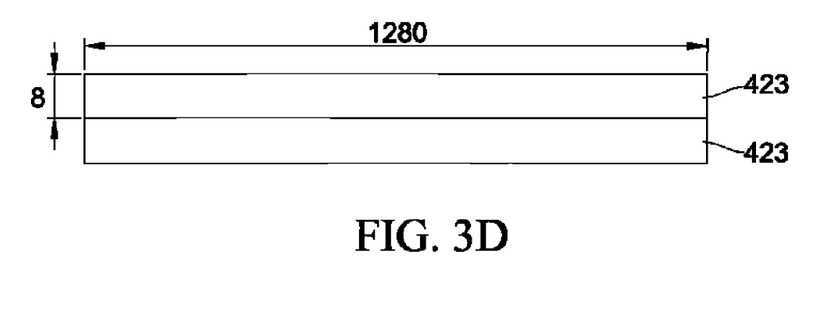
FIG. 3D is a schematic view of the configuration of a first logic buffer unit according to still another embodiment of the present invention.

For another example, when the row length of the image to be processed is 1280 pixels, and the value of each pixel requires 8 bits to represent, the configuration of the logic buffer unit is as shown in FIG. 3D. The first array controller 44 configures the physical buffer unit 422 as first logic buffer units 423 having the size of 1280×8 by reallocating memory addresses, so as to form two 1280×8 first logic buffer units 423 for the first array controller 44 to access image data.

The description above illustrates how the first array controller 44 configures the single physical buffer unit 422 as the required first logic buffer unit 423 according to the memory address configuration setting when the PMA 42 only has one physical buffer unit 422.

Hereinafter, how the first array controller 44 configures the plurality of physical buffer units 422 as the required first logic buffer units 423 according to the memory address configuration setting when the PMA 42 has the plurality of physical buffer units 422 is further disclosed.

Figure 4A:
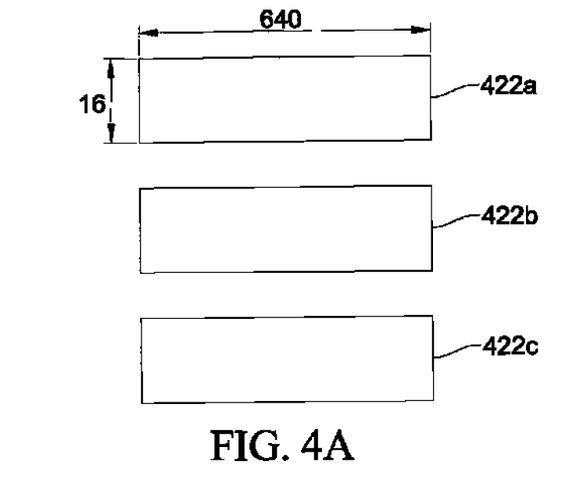
FIG. 4A is a schematic view of the configuration of a physical buffer unit according to an embodiment of the present invention.

Referring to FIGS. 4A, 4B, 4C and 4D, in which FIG. 4A is a schematic view of the physical buffer unit according to an embodiment of the present invention, and others are schematic views of the configuration of the first logic buffer unit according to different embodiments of the present invention.

In this embodiment, the PMA 42 of the routable image pipeline device comprises three physical buffer units 422a, 422b and 422c having the same size 640×16.

Figure 4B:
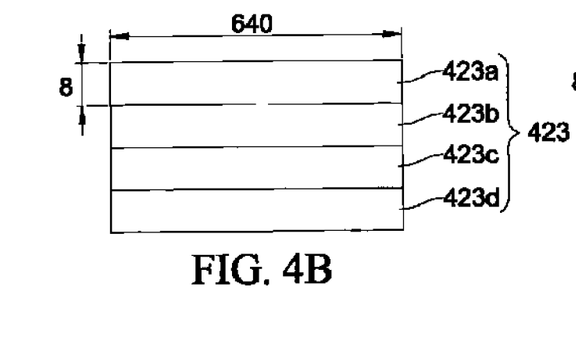
FIG. 4B is a schematic view of the configuration of a first logic buffer unit according to an embodiment of the present invention.

For example, when a row length of the image to be processed is 640 pixels, and the value of each pixel requires 8 bits to represent, the configuration of the logic buffer unit is as shown in FIG. 4B. The first array controller 44 divides the physical buffer units 422a and 422b respectively into two blocks by reallocating memory addresses, so as to obtain required first logic buffer units 423a, 423b, 423c and 423d having the size of 640×8. As such, the first logic buffer units 423a, 423b, 423c and 423d having the size of 640×8 are provided for the first array controller 44 to access image data.

Figure 4C:
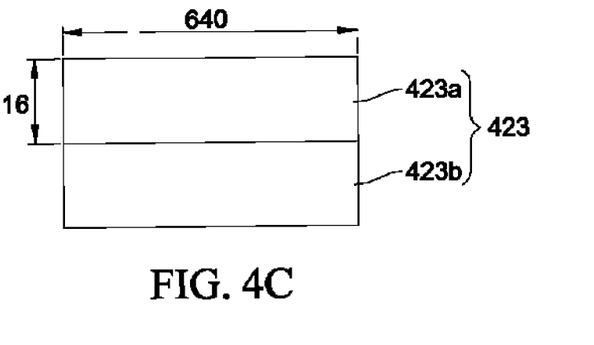
FIG. 4C is a schematic view of the configuration of a first logic buffer unit according to another embodiment of the present invention.

For another example, when the row length of the image to be processed is 640 pixels, and the value of each pixel requires 16 bits to represent, the configuration of the logic buffer unit is as shown in FIG. 4C. The first array controller 44 directly uses the physical buffer units 422a and 422b as the first logic buffer units 423a and 423b for the first array controller 44 to access image data.

Figure 4D:
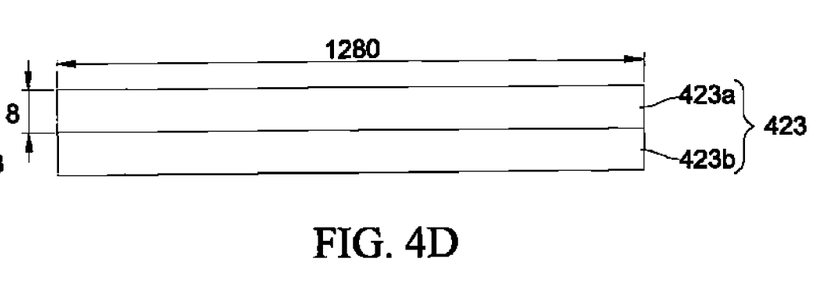
FIG. 4D is a schematic view of the configuration of a first logic buffer unit according to still another embodiment of the present invention.

For another example, when the row length of the image to be processed is 1280 pixels, and the value of each pixel requires 8 bits to represent, the configuration of the logic buffer unit is as shown in FIG. 4D. The first array controller 44 configures the physical buffer units 422a and 422b as first logic buffer units 423a and 423b having the size of 1280×8 by reallocating memory addresses, for the first array controller 44 to access image data.

In addition, the selected filters from the first filter set 52 will influence the allocation of the logic buffer units. The routable image processing device selects to execute the 7×7 filter 56a or the 3×3 filter 56b of the first filter set 52 according to the image processing content. As for the M×N filter, operation starts upon the $M^{th}$ pixel in the $N^{th}$ row of the image data is received. Therefore, when the image is processed by using the 7×7 filter 56a or the 3×3 filter 56b, the first filter set 52 can perform the image processing only when having at least (7−1) rows (or referred to number of lines of the line buffer) or (3−1) rows of the image. For example, when the number of lines of the line buffer is 6, the image may be processed through the 7×7 filter 56a, and operation starts upon the 7×7 filter 56a receives the $7^{th}$ pixel in the $7^{th}$ row of the image data. When the number of lines of the buffer is 3, the image may be processed through the 3×3 filter 56b, and operation starts upon the 3×3 filter 56b receives the $3^{rd}$ pixel in the $3^{rd}$ row of the image data.

[Second Embodiment]

Figure 5:
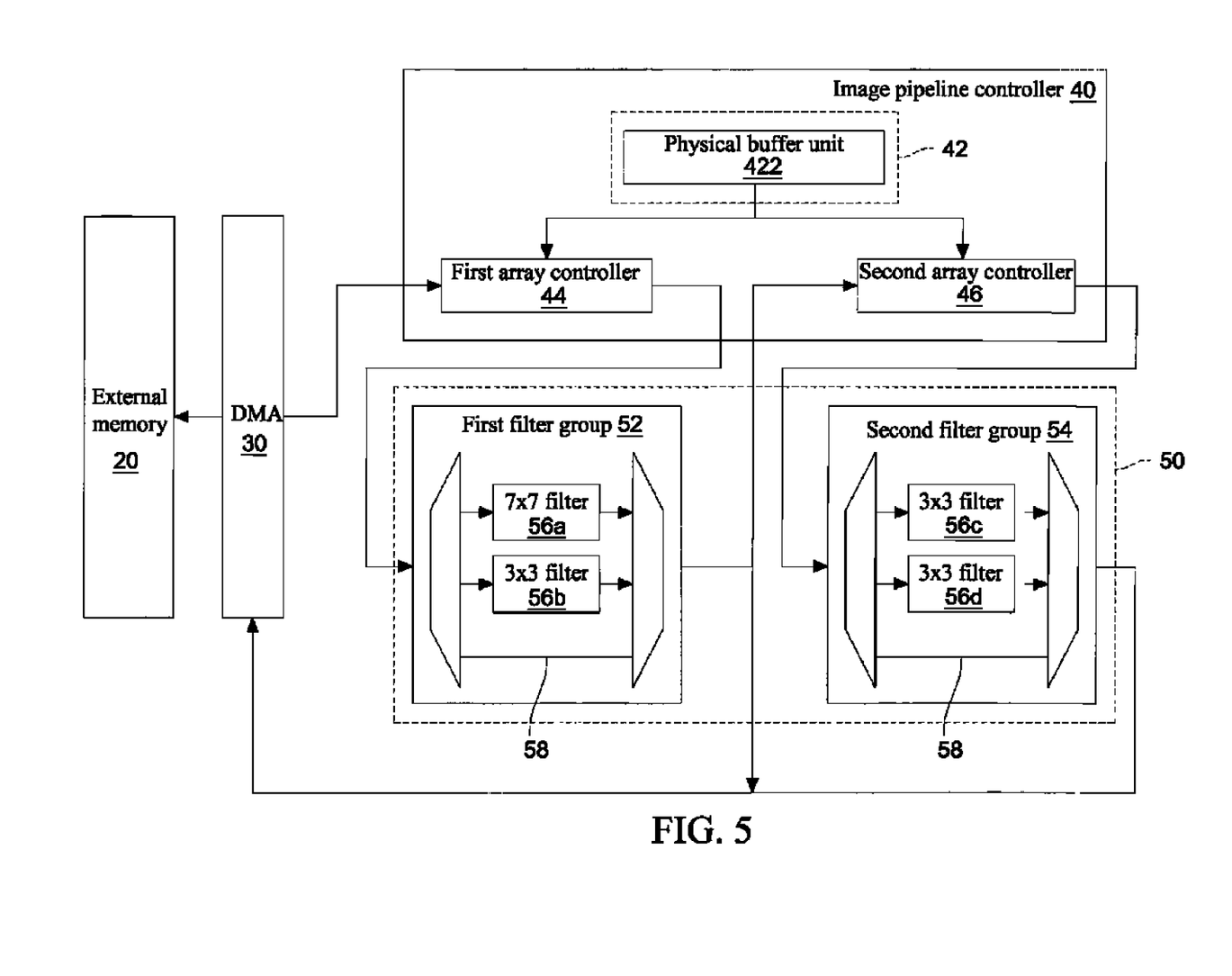
FIG. 5 is a schematic architectural view of a routable image pipeline device according to a second embodiment of the present invention.

FIG. 5 is a schematic architectural view of the routable image pipeline device according to a second embodiment of the present invention.

This embodiment is different from the first embodiment in that: the filter layer 50 of the routable image pipeline device further comprises a second filter set 54, and the image pipeline controller 40 further comprises a second array controller 46. The second filter set 54 is electrically connected to the second array controller 46 correspondingly, and the second filter set 54 comprises 3×3 filters 56c and 56d.

Similarly, the second array controller 46 configures the physical buffer unit 422 as a second logic buffer unit according to the memory address configuration setting, and the configuration principle is disclosed in the first embodiment and will not be described again here. The second array controller 46 also comprises the M×N array controller and the M×N filter array, so that after the M×N array controller arranges the received image into the M×N array, the M×N array is transmitted to the M×N filter array for image processing.

The DMA 30 reads the image to be processed from the external memory 20, and transmits the image to be processed to the first array controller 44 for rearrangement. The first array controller 44 arranges the image into an array, and the image is registered in the first logic buffer unit 423 during the rearrangement. After the rearrangement, the image is provided for the first filter set 52 to process. Then, the second array controller 46 receives the processed image from the first filter set 52, so as to further arrange the image into the array form required by the second filter set 54. The image is registered in the second logic buffer unit during the rearrangement. After the rearrangement, the image is transmitted to the second filter set 54 for processing. After receiving the image, the second filter set 54 processes the image selectively by using the 3×3 filter 56c or 56d, transmits the image result to the DMA 30, and stores the processed image back to the external memory 20 through the DMA 30.

More preferably, the first filter set 52 or the second filter set 54 may further comprise a bypass line 58. If the bypass line 58 in the first filter set 52 is selected and executed, it indicates that the 7×7 filter 56a and the 3×3 filter 56b are not used in this image processing stage, and so does the second filter set 54. Therefore, in a stage of image processing, the routable image pipeline device can perform processing by using the following combinations: the 7×7 filter 56a, the 3×3 filter 56b, the 3×3 filter 56c, the 3×3 filter 56d, the 7×7 filter 56a and the 3×3 filter 56c, the 7×7 filter 56a and the 3×3 filter 56d, the 3×3 filter 56b and the 3×3 filter 56c, and the 3×3 filter 56b and the 3×3 filter 56d.

The bypass line 58 may be practically implemented as a wire in the first filter set 52 or the second filter set 54, and the bypass line 58 may also be implemented as software. In the first filter set 52 or the second filter set 54, if no filter is selected to process the image, it indicates that the bypass line 58 is selected. The first array controller 44 and the second array controller 46 can configure the physical buffer unit 422 together. That is, the physical buffer unit 422 can be divided into at least two parts, each being configured by the first array controller 44 and the second array controller 46 as the first logic buffer unit 423 and the second logic buffer unit.

Moreover, after the image is processed by the filters of the first filter set 52, the processed image can be stored back to the external memory 20 through the DMA 30 without passing through the second filter set 54 (that is, the bypass line 58 of the second filter set 54 is designated through a configuration command).

[Third Embodiment]

Figure 6:
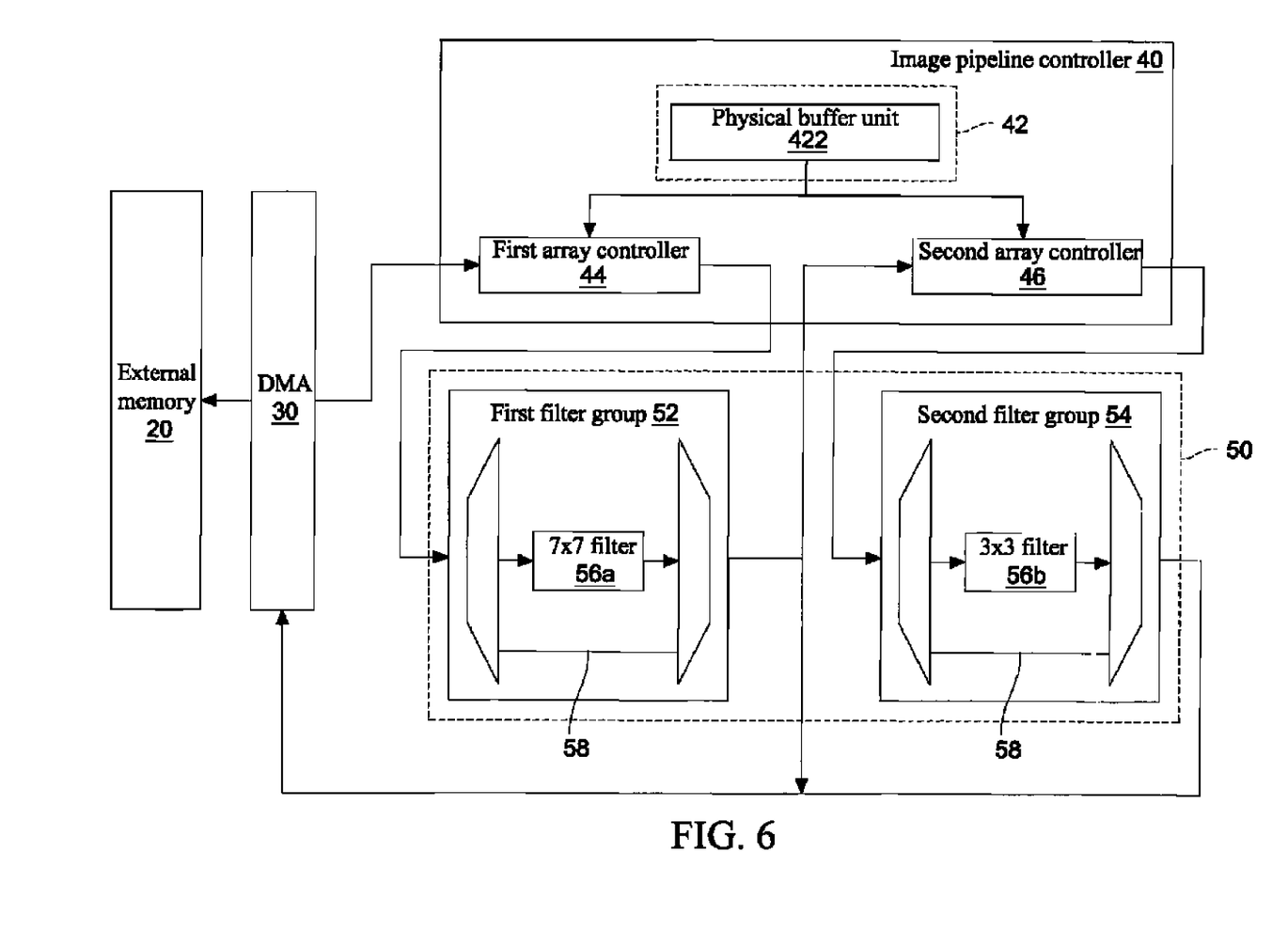
FIG. 6 is a schematic architectural view of a routable image pipeline device according to a third embodiment of the present invention.

FIG. 6 is a schematic architectural view of the routable image pipeline device according to a third embodiment of the present invention.

In the third embodiment, the routable image pipeline device comprises a first array controller 44, a second array controller 46, a first filter set 52, and a second filter set 54. The first array controller 44 is electrically connected to the first filter set 52 correspondingly, and the second array controller 46 is electrically connected to the second filter set 54 correspondingly. The first filter set 52 and the second filter set 54 each comprise a filter (a 7×7 filter 56a and a 3×3 filter 56b) and a bypass line 58. The routable image pipeline device processes the image selectively by using the 7×7 filter 56a and the 3×3 filter 56b.

In other words, the routable image pipeline device comprises a plurality of filter sets and a plurality of filters, and each filter set is electrically connected to the array controller correspondingly. The filter sets each at least comprise a filter to process the image, and may comprise the bypass line 58. Each array controller configures the physical buffer unit 422 as the required logic buffer unit, and provides the logic buffer unit to the filter of the corresponding filter set for use. For example, the first array controller 44 and second array controller 46 respectively configure the physical buffer unit 422 as the first logic buffer unit 423 and the second logic buffer unit, so as to be provided for the 7×7 filter 56a of the first filter set 52 and the 3×3 filter 56c of the second filter set 54 for use.

It should be noted that, when the filter of only one filter set is designated, and the other filter sets are all designated to execute the bypass line 58, the physical buffer unit 422 can only be configured as the logic buffer unit corresponding to the designated filter. Finally, the image is processed according to the logic buffer unit and the filters.

For example, when the configuration command designates that the 7×7 filter 56a processes the image, the first array controller 52 configures the physical buffer unit 422 to obtain the first logic buffer unit 423 according to the configuration command and the 7×7 filter 56a. The routable image pipeline device processes the image only with the 7×7 filter 56a and the first logic buffer unit 423.

More preferably, after the image is processed by the 7×7 filter 56a, the image is stored back to the external memory 20 through the DMA 30.

[Fourth Embodiment]

Figure 7:
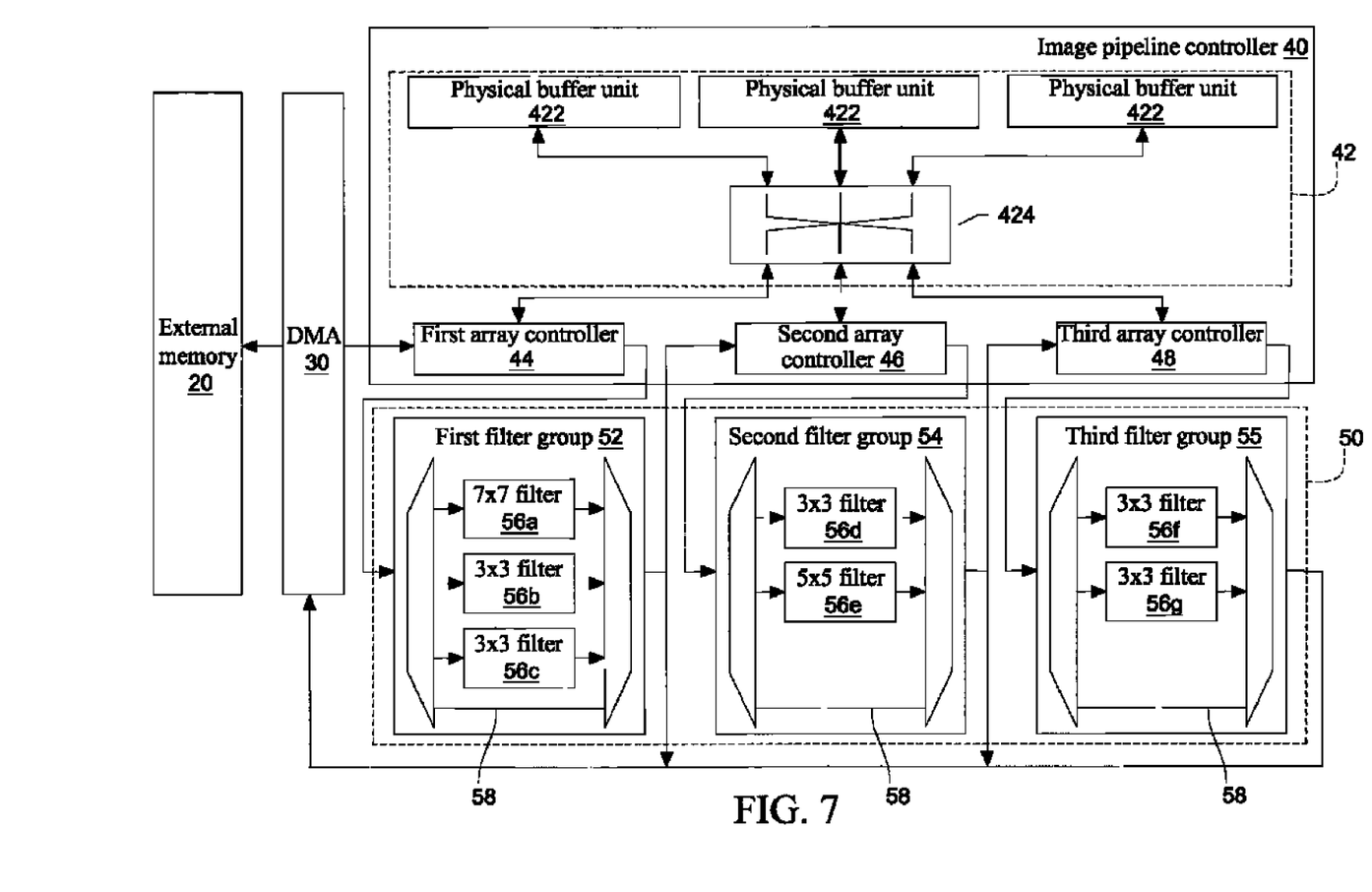
FIG. 7 is a schematic architectural view of a routable image pipeline device according to a fourth embodiment of the present invention.

FIG. 7 is a schematic architectural view of a routable image pipeline device according to a fourth embodiment of the present invention. The complete routable image processing method is introduced below with reference to the fourth embodiment.

As shown in FIG. 7, the routable image pipeline device comprises the external memory 20, a DMA 30, the image pipeline controller 40, and the filter layer 50. The PMA 42 of the image pipeline controller 40 comprises a plurality of physical buffer units 422 and a buffer switch 424, and the image pipeline controller 40 further comprises the first array controller 44, the second array controller 46, and a third array controller 48. The filter layer 50 comprises the first filter set 52, the second filter set 54, and a third filter set 55.

The first filter set 52 comprises the 7×7 filter 56a, the 3×3 filter 56b, and the 3×3 filter 56c; the second filter set 54 comprises the 3×3 filter 56d and a 5×5 filter 56e; and the third filter set 55 comprises a 3×3 filter 56f and a 3×3 filter 56g. The 7×7 filter 56a is a raw filter; the 3×3 filter 56b, the 3×3 filter 56d, and the 3×3 filter 56f are CFA filters; and the 3×3 filter 56c, the 5×5 filter 56e, and the 3×3 filter 56g are YUV filters.

The third array controller 48 may also comprise the M×N array controller and the M×N filter array, such that after the M×N array controller arranges the received image into the M×N array, the M×N array is transmitted to the M×N filter array for image processing.

For example, when a digital camera captures the image and processes the image into the image of a YUV color space format, the routable image pipeline device receives raw data of the image, and processes the image by using all the filters. The processing procedure may be divided into three stages, namely, a stage of processing the raw data of the image (raw stage); a stage of converting the image to an RGB color space format (RGB stage); and a stage of converting the image of the RGB color space format to the YUV color space format (YUV stage).

In different image processing stages, the routable image pipeline device can select different filters to process the image. Before processing the image in each stage, the routable image pipeline device receives the configuration command, so as to know which filter or filters is to be used to process the image in this stage. Further, in different stages, different filters may be selected, so the array controllers have to reconfigure the physical buffer unit 422 as a suitable logic buffer unit according to the requirements. Moreover, after the processing in each stage is completed, the processed image is always stored back to the external memory 20.

It is assumed that the digital camera accesses the image (still image) in the tile-based scanning mode. First, in the raw stage, only the 7×7 filter 52a of the first filter set 52 is selected, and the second filter set 54 and the third filter set 55 all execute the bypass line 58. Therefore, the first array controller 44 configures the physical buffer unit 422 as the first logic buffer unit 423 according to the scanning mode and the 7×7 filter 56a, and the first array controller 44 accesses the physical buffer unit 422 through the buffer switch 424. Thus, the routable image pipeline device processes the image by using the 7×7 filter 56a and the first logic buffer unit 423, and stores the image processed by the 7×7 filter 56a back to the external memory 20 through the DMA 30.

In the RGB stage, the first array controller 44, the second array controller 46, and the third array controller 48 reconfigure the physical buffer unit 422 as the first logic buffer unit 423, the second logic buffer unit, and a third logic buffer unit according to the scanning mode and the 3×3 filters 56b, 56d, and 56f. The routable image pipeline device reads the image processed in the raw stage from the external memory 20, processes the image sequentially by using the 3×3 filters 56b, 56d, and 56f together with the first logic buffer unit 423, the second logic buffer unit, and the third logic buffer unit, and stores the processed image back to the external memory 20.

Finally, in the YUV stage, the first array controller 44, the second array controller 46, and the third array controller 48 reconfigure the physical buffer unit 422 as the first logic buffer unit 423, the second logic buffer unit, and the third logic buffer unit according to the scanning mode and the 3×3 filter 56c, the 5×5 filter 56e, and the 3×3 filter 56g. The routable image pipeline device reads the image processed in the raw stage and the RGB stage from the external memory 20, processes the image sequentially by using the 3×3 filter 56c, the 5×5 filter 56e, and the 3×3 filter 56g together with the first logic buffer unit 423, the second logic buffer unit, and the third logic buffer unit, and stores the image after all the processing stages back to the external memory 20.

For another example, when a video camera intends to convert a video to a RGB color space format, the routable image pipeline device only performs the image processing in the RGB stage. More particularly, the routable image pipeline device accesses the image in the frame-based scanning mode, and when processing the frames of the vide with the 3×3 filters 56b, 56d, and 56f and the corresponding first logic buffer unit 423, the routable image pipeline device only processes the image (different frames of the video) by using the logic buffer unit 423, the second logic buffer unit, and the third logic buffer unit, and stores the processed image back to the external memory 20.

It should be noted that, by using the routable image pipeline device having the above structure, the routable image pipeline device can be expanded easily. New image processing may be performed by the routable image pipeline device by adding new filters to the filter set. When it is desired to process the image by using more filters in one processing stage, new filter sets and corresponding array controllers may be added.

When the physical buffer unit 422 of the routable image pipeline device is insufficient, for example, a new line buffer may be added to increase the total capacity of the physical buffer unit 422, or the original physical buffer unit 422 is replaced by the physical buffer unit 422 having a larger capacity. Therefore, the array controller may configure the physical buffer unit 422 as the logic buffer unit by reallocating addresses, and provides the logic buffer unit to the filter for use. In other words, the filter accesses the physical buffer unit 422 through the array controller. Therefore, the expanded physical buffer unit 422 can be provided to all the filters through the logic buffer unit, which is rather convenient.

Figure 8:
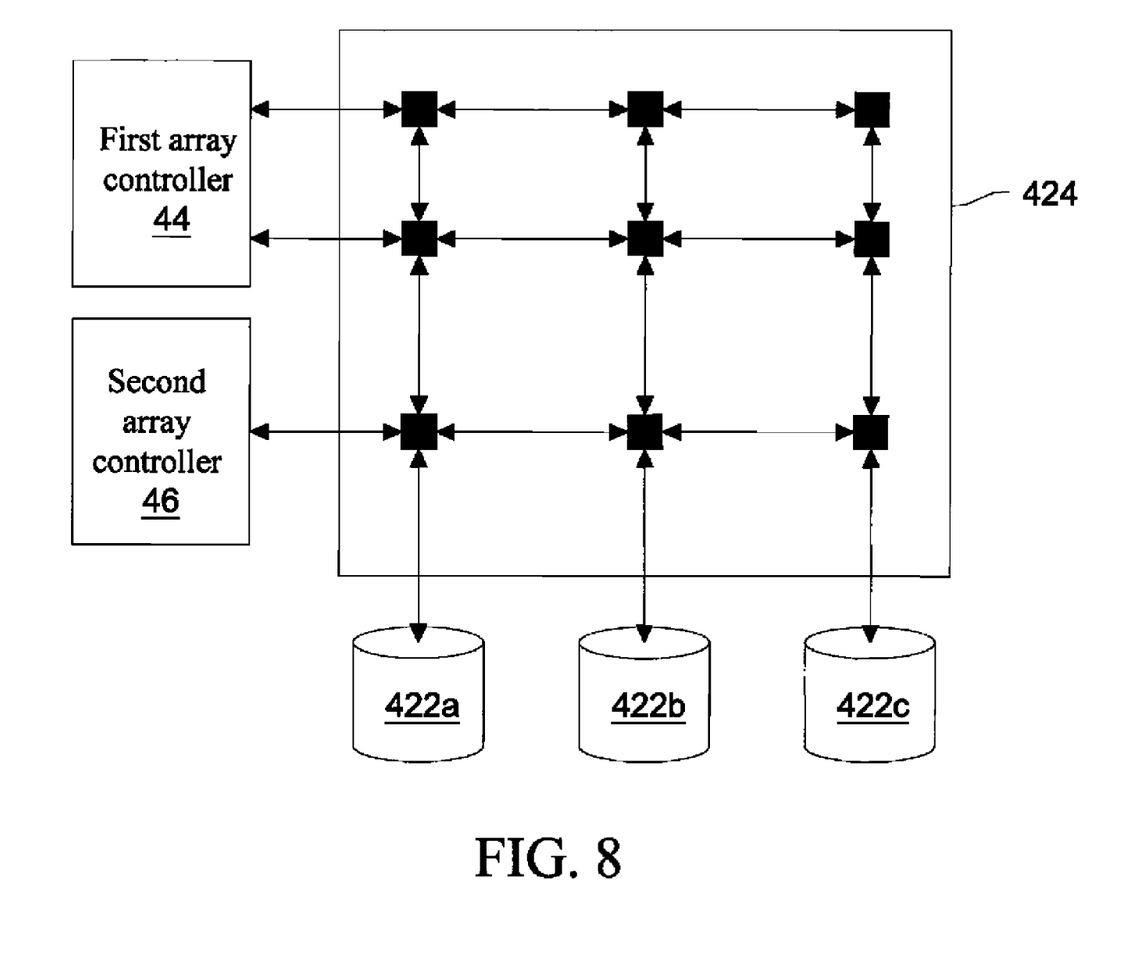
FIG. 8 is a schematic architectural view of a buffer switch according to an embodiment of the present invention.

FIG. 8 is a schematic architectural view of a buffer switch according to an embodiment of the present invention is shown. The PMA 42 has a buffer switch 424, and physical buffer units 422a, 422b, and 422c. The 7×7 filter 56a and the 3×3 filter 56b can access the physical buffer units 422a, 422b, and 422c with a read/write line respectively through the first array controller 44 and the second array controller 46. The buffer switch 424 switches the connections between the read/write line and the physical buffer units 422a, 422b, and 422c according to the addressed allocated to the first array controller 44 and the second array controller 46. Therefore, the 7×7 filter 56a and the 3×3 filter 56b in different filter sets may access the corresponding logic buffer units simultaneously. That is, the buffer switch 424 further increases the read/write bandwidth of the physical buffer units 422.

The read/write line may be, for example, a 16-bit or 32-bit bus, which can be configured according to the bandwidth. For example, the 3×3 filter 56b may only require the 16-bit bus, and the 7×7 filter 56a requires the 32-bit bus line.

In addition, when only one physical buffer unit 422 is provided for the plurality of array controllers, the routable image pipeline device may also be configured with the buffer switch 424. For example, in special cases when the first array controller 44 and the second array controller 46 send requests to the physical buffer unit 422 at the same time, the buffer switch 424 acts as arbitration for assigning the first array controller to perform the access. In view of the above, the routable image pipeline device according to the present invention processes the image selectively with the filters in each filter set of the filter layer. The routable image pipeline device manages the physical buffer units in the image pipeline controller collectively, and accesses the physical buffer units through the array controllers. The array controller is corresponding to the filter set, and configures the physical buffer unit as the logic buffer unit corresponding to the filter to be executed according to the scanning mode of the image and the filter to be executed. Through the mechanism of configuring the physical buffer unit as the logic buffer unit, the scanning mode of the image and the filters are no longer limits to the physical buffer unit. Further, the buffer space used by the whole routable image pipeline device can be easily expanded by adding new physical buffer units.

Moreover, when performing the digital image processing, required filters are selected from the filter set, so high repeatability is achieved. Furthermore, the routable image pipeline device can be easily expanded by adding new filters or filter sets and array controllers in pairs.

What is claimed is:

1. A routable image pipeline device, suitable for processing at least one image, comprising:
   an external memory, storing the image;
   a direct memory access (DMA), electrically connected to the external memory;
   an image pipeline controller, comprising:
   a physical memory allocation (PMA), having at least one physical buffer unit; and
   a first array controller, electrically connected to the PMA and the DMA, wherein the first array controller configures the physical buffer unit as at least one first logic buffer unit according to memory address configuration setting, and receives the image through the DMA; and
   a filter layer, comprising a first filter set having a plurality of filters, wherein the first filter set is electrically connected to the first array controller, receives the image through the first array controller, processes the image selectively according to the first logic buffer unit and the filters, and stores the processed image back to the external memory through the DMA.

2. The routable image pipeline device according to claim 1, wherein the image pipeline controller further comprises a second array controller for configuring the physical buffer unit as at least one second logic buffer unit according to the memory address configuration setting, the filter layer further comprises a second filter set electrically connected to the second array controller and having the plurality of filters, the second array controller receives the image from the first filter set and transmits the image to the second filter set for processing, and the second filter set processes the image selectively according to the second logic buffer unit and the filters of the second filter set, and stores the processed image back to the external memory through the DMA.

3. The routable image pipeline device according to claim 2, wherein the PMA further comprises a buffer switch electrically connected to the physical buffer unit, the first array controller, and the second array controller; the first array controller and the second array controller access the physical buffer unit through the buffer switch.

4. The routable image pipeline device according to claim 3, wherein the PMA at least has a plurality of the physical buffer units electrically connected to the buffer switch, the first array controller and the second array controller access the physical buffer units through the buffer switch; the first array controller configures the physical buffer units as the first logic buffer unit according to the memory address configuration setting, and the second array controller configures the physical buffer units as the second logic buffer unit according to the memory address configuration setting.

5. The routable image pipeline device according to claim 2, wherein the second filter set further comprises a bypass line.

6. The routable image pipeline device according to claim 1, wherein the first filter set further comprises a bypass line.

7. The routable image pipeline device according to claim 1, wherein each of the filters has a filter size, and one of the filter sizes is different from one another.

8. A routable image pipeline device, suitable for processing at least one image, comprising:
   an external memory, storing the image;
   a direct memory access (DMA), electrically connected to the external memory;
   an image pipeline controller, comprising:
   a physical memory allocation (PMA), having at least one physical buffer unit; and
   a plurality of array controllers, receiving the image through the DMA, and configuring the physical buffer unit as a plurality of logic buffer units respectively corresponding to the array controllers according to memory address configuration setting; and
   a filter layer, comprising:
   a plurality of filter sets, wherein each of the filter sets is electrically connected to one of the array controllers correspondingly, and each of the filter sets has at least one filter, the filter sets receive the image through the corresponding array controllers, process the image selectively according to the logic buffer units and the filters of the filter sets, and store the processed image back to the external memory through the DMA.

9. The routable image pipeline device according to claim 8, wherein the filter sets further comprises a bypass line.

10. The routable image pipeline device according to claim 8, wherein the PMA further comprises a buffer switch electrically connected to the physical buffer unit and each of the array controllers; the array controllers access the physical buffer unit through the buffer switch.

11. The routable image pipeline device according to claim 10, wherein the PMA at least has a plurality of the physical buffer units electrically connected to the buffer switch, the array controllers access the physical buffer units through the buffer switch; the array controllers configure the physical buffer units as the logic buffer units respectively corresponding to the array controllers according to the memory address configuration setting.

12. The routable image pipeline device according to claim 8, wherein each of the filters has a filter size, and one of the filter sizes is different from one another.

* * * * *